US012271972B2

(12) United States Patent
Sugano et al.

(10) Patent No.: US 12,271,972 B2
(45) Date of Patent: Apr. 8, 2025

(54) PARKING MANAGEMENT SYSTEM AND PARKING MANAGEMENT METHOD (71) Applicant: TOYOTA JIDOSHA KABUSHIKI KAISHA, Toyota (JP)

(72) Inventors: Tatsuya Sugano, Shizuoka-ken (JP); Hiroya Chiba, Fuji (JP); Rika Oike, Shizuoka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/529,764

(22) Filed: Dec. 5, 2023

(65) Prior Publication Data
US 2024/0257286 A1 Aug. 1, 2024

(30) Foreign Application Priority Data
Jan. 31, 2023 (JP) .................. 2023-013134

(51) Int. Cl.
*G06Q 50/40* (2024.01)
*B60W 30/06* (2006.01)

(52) U.S. Cl.
CPC ............. *G06Q 50/40* (2024.01); *B60W 30/06* (2013.01)

(58) Field of Classification Search
None
See application file for complete search history.

(56) References Cited

U.S. PATENT DOCUMENTS

| 2017/0292854 A1* | 10/2017 | Zhang | G05D 1/0088 |
| 2020/0013288 A1* | 1/2020 | Stefik | G08G 1/142 |
| 2020/0311641 A1* | 10/2020 | Noguchi | G06V 20/586 |
| 2020/0311849 A1 | 10/2020 | Noguchi et al. | |
| 2020/0365019 A1 | 11/2020 | Noguchi et al. | |
| 2020/0388155 A1 | 12/2020 | Mukaiyama | |

FOREIGN PATENT DOCUMENTS

| JP | 2020-166710 A | 10/2020 |
| JP | 2020-187563 A | 11/2020 |
| JP | 2020-201666 A | 12/2020 |

OTHER PUBLICATIONS

Lopez, Steve, "Column: Living in a parking lot amid Santa Barbara's wealth is a kind of middle-class Homelessness", LA Times, https://www.latimes.com/local/california/la-me-lopez-safe-parking-20171224-story.html, published Dec. 23, 2017 (Year: 2017).*

* cited by examiner

Primary Examiner — George Chen
(74) Attorney, Agent, or Firm — Sughrue Mion, PLLC (57) ABSTRACT The present disclosure proposes a parking management system for managing parking of vehicles in a parking lot of a specific facility including a pick-up and drop-off area. The parking management system comprises one or more processors. The one or more processors are configured to execute, when a vehicle enters the parking lot, acquiring a scheduled usage time at which a passenger of the vehicle is scheduled to use the specific facility. And the one or more processors are configured to execute the following first and second processes. The first process is parking the vehicle in the parking lot when the scheduled usage time is more than a predetermined time after a current time. The second process is moving the vehicle to the pick-up and drop-off area in response to the current time becoming the predetermined time before the scheduled usage time after the vehicle is parked.

4 Claims, 6 Drawing Sheets

PARKING MANAGEMENT SYSTEM AND PARKING MANAGEMENT METHOD

CROSS-REFERENCE TO RELATED APPLICATION

The present application claims priority to Japanese Patent Application No. 2023-013134, filed on Jan. 31, 2023, the contents of which application are incorporated herein by reference in their entirety.

BACKGROUND

Technical Field

The present disclosure relates to a technique for managing parking of vehicles in a parking lot.

Background Art

Patent Literature 1 discloses a technique related to a parking control device that performs parking control of a vehicle in an automatic valet parking lot including a plurality of parking areas.

In addition, the following Patent Literature 2 and 3 are documents showing the technical level of the present technical field.

LIST OF RELATED ART

Patent Literature 1: JP 2020201666 A
Patent Literature 2: JP 2020166710 A
Patent Literature 3: JP 2020187563 A

SUMMARY

One type of parking lot is a facility parking lot provided for facility users. A passenger of a vehicle entering the facility parking lot is expected to use the facility after getting off the vehicle. Conventionally, a technique related to auto valet parking (AVP) that parks a vehicle in a parking lot after the passenger gets off the vehicle has been considered.

On the other hand, there is a case where the vehicle arrives at the parking lot considerably earlier than the scheduled usage time at which the passenger uses the facility. In such a case, the passenger may feel annoyed by waiting at the facility until the scheduled usage time after getting off the vehicle. In addition, in a case where a sufficient standby space is not prepared in the facility, it may be undesirable for the facility to have the passenger wait at the facility until the scheduled time.

In view of the above problems, an object of the present disclosure is to provide a technique for managing parking of vehicles in a parking lot of a specific facility, which is capable of reducing the time that a passenger waits at the facility until the scheduled usage time after getting off the vehicle.

A first aspect of the present disclosure is directed to a parking management system for managing parking of vehicles in a parking lot of a specific facility including a pick-up and drop-off area.

The parking management system according to the first aspect comprises one or more processors configured to execute:
  when a vehicle enters the parking lot, acquiring a scheduled usage time at which a passenger of the vehicle is scheduled to use the specific facility;
  a first process of parking the vehicle in the parking lot when the scheduled usage time is more than a predetermined time after a current time; and
  a second process of moving the vehicle to the pick-up and drop-off area in response to the current time becoming the predetermined time before the scheduled usage time after the vehicle is parked in the parking lot.

A second aspect of the present disclosure relates to a parking management method for managing parking of vehicles in a parking lot of a specific facility including a pick-up and drop-off area.

The parking management method according to the second aspect includes:
  when a vehicle enters the parking lot, acquiring a scheduled usage time at which a passenger of the vehicle is scheduled to use the specific facility;
  parking the vehicle in the parking lot when the scheduled usage time is more than a predetermined time after a current time; and
  moving the vehicle to the pick-up and drop-off area in response to the current time becoming a predetermined time before the scheduled usage time after the vehicle is parked in the parking lot.

According to the present disclosure, when a vehicle entering a parking lot arrives at the parking lot earlier than a scheduled usage time of a passenger, the vehicle is parked in the parking lot without causing the passenger to get off the vehicle. When the scheduled usage time of the passenger approaches, the vehicle is moved to the pick-up and drop-off area and the passenger gets off. Thus, even if the vehicle arrives at the parking lot earlier than the scheduled usage time, the passenger of the vehicle can spend time in the vehicle until the scheduled usage time approaches. In addition, it is possible to reduce the time that the passenger waits at the facility until the scheduled usage time after getting off the vehicle.

DETAILED DESCRIPTION

1. Parking Management System

The parking management system according to the present embodiment manages parking of a vehicle in a parking lot of a specific facility. Examples of the specific facility include a hospital, a public office, a restaurant, a movie theater, and a leisure facility.

Figure 1:
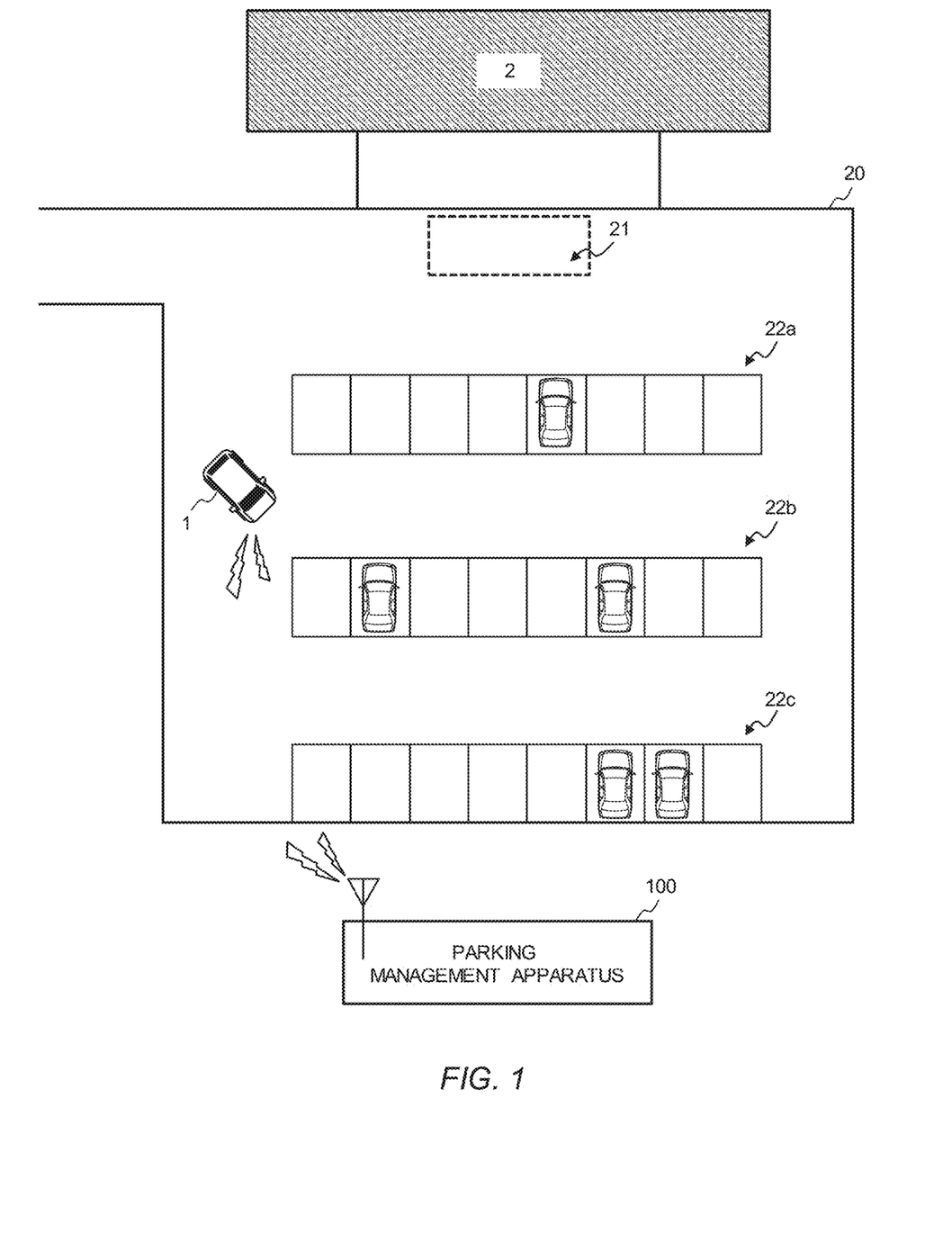
FIG. 1 is a diagram showing an example of a parking lot to which a parking management system according to the present embodiment is applied.

FIG. 1 is a conceptual diagram showing an example of a parking lot 20 to which a parking management system according to the present embodiment is applied. The parking lot 20 shown in FIG. 1 is a parking lot of a specific facility 2. The parking lot 20 is typically provided for a user of the facility 2 using the vehicle 1 as a means of transportation to park the vehicle 1. That is, the passenger of the vehicle 1 entering the parking lot 20 is typically a user of the facility 2.

The parking lot 20 includes a pick-up and drop-off area 21 and three parking spaces 22a, 22b, and 22c. The vehicle 1 of the parking lot 20 can allow a user of the facility 2 to get on and off in the pick-up and drop-off area 21. Vehicle 1 in parking lot 20 can be parked in a parking frame of any parking space.

The parking management system according to the present embodiment includes a parking management apparatus 100. The movement of the vehicle 1 in the parking lot 20 is managed by the parking management apparatus 100. The parking management apparatus 100 communicates with the vehicle 1 of the parking lot 20 and transmits instruction information for managing the movement of the vehicle 1. The instruction information is, for example, start/end of movement, a movement destination point, a corridors for the movement, a parking position, a parking time, and the like. The vehicle 1 is configured to start communication with the parking management apparatus 100 in the parking lot 20 and perform autonomous driving in accordance with instruction information received from the parking management apparatus 100. The vehicle 1 moves in accordance with the instruction information received from the parking management apparatus 100, and thus the management of the movement of the vehicle 1 by the parking management apparatus 100 is realized.

Although FIG. 1 illustrates an example in which the parking management apparatus 100 manages the movement of one vehicle 1, the parking management apparatus 100 may be configured to manage the movement of a plurality of vehicles in the parking lot 20. In particular, the parking management apparatus 100 may be configured to manage the movement of all vehicles in the parking lot 20. Hereinafter, a case where the parking management apparatus 100 manages the movement of one vehicle 1 will be described. However, the following description may be suitably extended to a case where the parking management apparatus 100 manages the movement of a plurality of vehicles in the parking lot 20.

Figure 2:
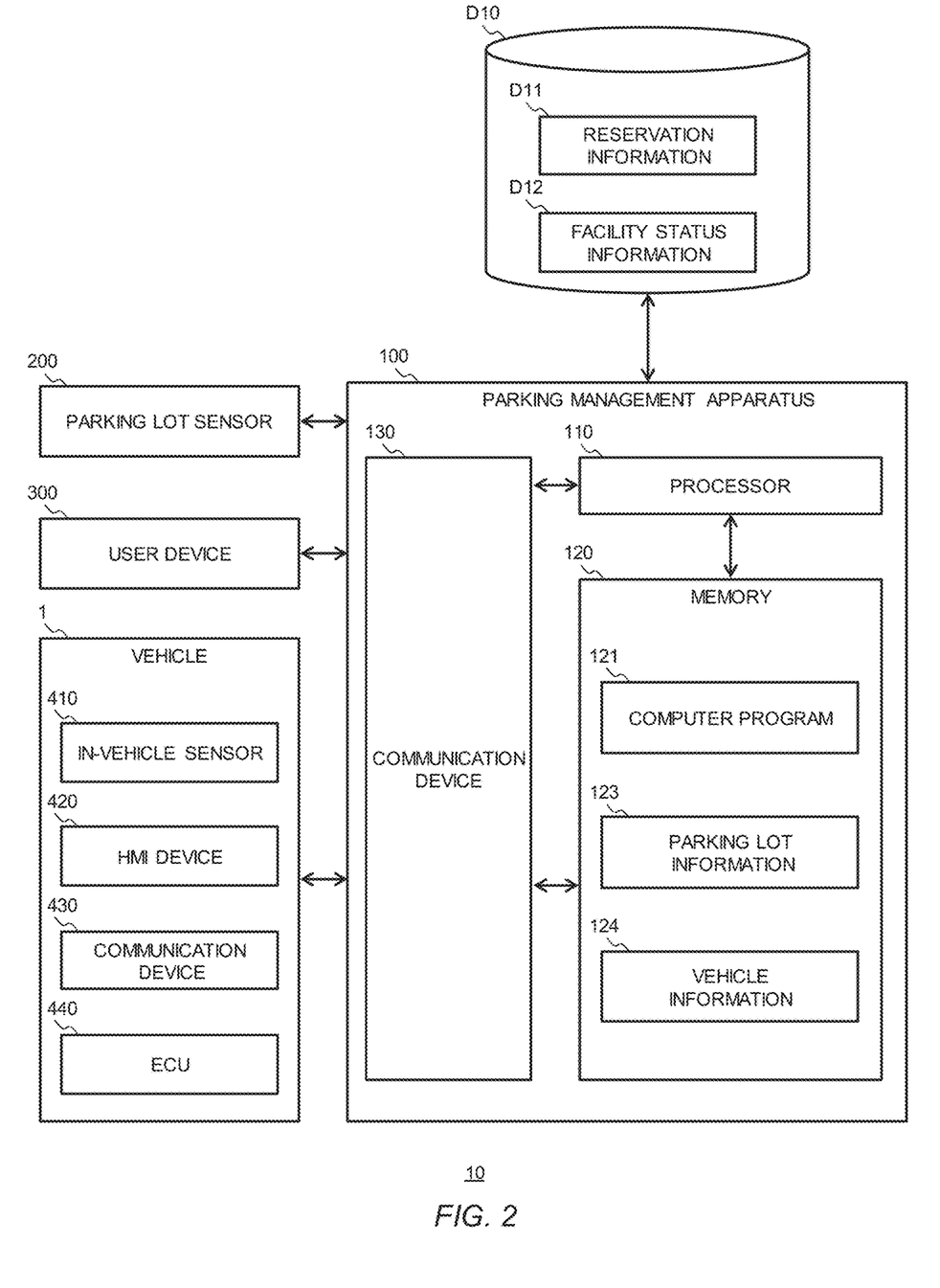
FIG. 2 is a diagram showing an example of a configuration of the parking management system according to the present embodiment.

FIG. 2 is a diagram illustrating an example of a configuration of the parking management system 10 according to the present embodiment.

The parking management apparatus 100 is configured to communicate with the parking lot sensor 200, the user device 300, and the vehicle 1. For example, the parking management apparatus 100 is connected to these devices via a moving body communication network or the Internet.

The parking lot sensor 200 is a sensor that is installed in the parking lot 20 and detects the situation of the parking lot 20. For example, the parking lot sensor 200 detects the situation (position, traveling state, and the like) of the vehicle 1 in the parking lot 20, the availability of the parking space, the situation of a pedestrian or an obstacle in the parking lot 20, and the like. The parking lot sensor 200 may be configured by a camera, for example.

The user device 300 is a terminal operated by a user of the parking management system 10. The user of the parking management system 10 is typically a passenger of the vehicle 1 or a user of the facility 2. The user device 300 receives input of predetermined information from the user and transmits the input information to the parking management apparatus 100. The user device 300 may be configured to communicate with the parking management apparatus 100 on a predetermined application. In this case, a smartphone, a tablet terminal, or the like is exemplified as the user device 300. However, the user device 300 may be a dedicated terminal for configuring the parking management system 10. For example, the user device 300 may be a dedicated terminal installed at the entrance of the parking lot 20 or in the pick-up and drop-off area 21.

The vehicle 1 includes an in-vehicle sensor 410, an HMI device 420, a communication device 430, and an ECU 440.

The in-vehicle sensor 410 detects information related to the driving environment of the vehicle 1. Examples of the in-vehicle sensor 410 include sensors that detect the surrounding environment of the vehicle 1 (preceding vehicle, white line, obstacle, and the like) such as a camera, a millimeter wave radar, and a LiDAR, and sensors that detect the traveling state of the vehicle 1 (vehicle speed, acceleration, yaw rate, and the like) such as a wheel speed sensor and an inertial measurement unit (IMU).

The HMI device 420 is a device that provides an HMI function to the passenger of the vehicle 1. The HMI device 420 is configured by, for example, a display, a switch, a touch screen, a microphone, a speaker, and the like. The passenger of the vehicle 1 can transmit various kinds of information to the parking management apparatus 100 by operating the HMI device 420.

The communication device 430 communicates with a device outside the vehicle 1 to transmit and receive information. In particular, the communication device 430 communicates with the parking management apparatus 100 to transmit and receive information. For example, the communication device 430 may communicate with the parking management apparatus 100 to receive instruction information. For example, the communication device 430 transmits detection information of the in-vehicle sensor 410, a processing result of the ECU 440, identification information of the vehicle 1, attribute information (vehicle type, vehicle specifications, and the like) of the vehicle 1, identification information of a passenger of the vehicle 1, and the like to the parking management apparatus 100. The communication device 430 is, for example, a communication module that performs moving body communication.

The ECU 440 executes processing related to various controls of the vehicle 1. At least the ECU 440 is configured to execute a process of performing automated autonomous driving of the vehicle 1 in accordance with instruction information received from the parking management apparatus 100. For example, the ECU 440 executes a process of generating a travel trajectory of the vehicle 1 so as to satisfy instruction information on the basis of information detected by the in-vehicle sensor 410, and a process of controlling acceleration, braking, and steering of the vehicle 1 so that the vehicle 1 travels along the travel trajectory. Note that a suitable known technique may be applied to the processing related to autonomous driving.

The parking management apparatus 100 is configured to be able to access the database D10 of the facility 2. For example, the database D10 is stored in a server on the Internet, and the parking management apparatus 100 accesses the database D10 by communicating with the server via the Internet.

The database D10 includes a reservation information D11 and a facility status information D12.

The reservation information D11 manages the reservation status of each of the users of the facility 2 in association with the identification information of each of the users. The D11 status managed by the reservation information reservation includes, for example, the reservation contents and information of the scheduled usage time using facility 2. For example, when the facility 2 is a hospital, the reservation information D11 manages the content of the medical examination and the date and time of the medical examination. Further, the D11 status managed by the reservation information reservation may include information on whether or not the parking lot 20 is scheduled to be used. In particular, when the user plans to use the parking lot 20, the reservation status may include identification information of the vehicle 1 (for example, number information of the vehicle 1) that the user plans to board.

The facility status information D12 is information indicating the status of the facility 2. As the facility status information D12, for example, a congestion status in the facility 2, a reception status of the facility 2, and the like are exemplified.

The parking management apparatus 100 is a computer including one or more processors 110 (hereinafter, simply referred to as "processor 110"), one or more memories 120 (hereinafter, simply referred to as "memory 120"), and a communication device 130.

The processor 110 executes various processes and generates instruction information. The processor 110 can be configured by, for example, a central processing unit (CPU) including an arithmetic device, a register, and the like. The memory 120 is connected to the processor 110 and stores various kinds of information necessary for the processor 110 to execute processing. The memory 120 may be configured by a recording medium such as a read only memory (ROM), a random-access memory (RAM), a hard disk drive (HDD), or a solid state drive (SSD). The communication device 130 is connected to the processor 110 and the memory 120, and communicates with an external device of the parking management apparatus 100 to transmit and receive information. In particular, the communication device 130 may transmit and receive information by communicating with the parking lot sensor 200, the user device 300, and the vehicle 1. For example, the communication device 130 transmits instruction information generated by the processor 110 to the vehicle 1. The communication device 130 is, for example, a device that connects to the Internet and communicates.

The memory 120 stores a computer program 121, parking lot information 123, and vehicle information 124.

The computer program 121 is stored in a computer-readable recording medium. The computer program 121 is configured by a plurality of instructions for causing the processor 110 to execute processing. The processor 110 operates in accordance with the plurality of instructions, and thus the processor 110 executes various processes.

The parking lot information 123 is information related to the parking lot 20. As the parking lot information 123, information of the parking lot 20 detected by the parking lot sensor 200, map information of the parking lot 20, and the like are exemplified.

The vehicle information 124 is information on the vehicle 1 of the parking lot 20. Examples of the vehicle information 124 include position information of the vehicle 1 in the parking lot 20, identification information of the vehicle 1, attribute information of the vehicle 1, and a boarding situation of the vehicle 1. The parking management apparatus 100 may be configured to acquire the vehicle information 124 from the vehicle 1. Alternatively, the vehicle information 124 may be information of the vehicle 1 detected by the parking lot sensor 200.

2. Process

The parking management system 10 according to the present embodiment has a function (hereinafter, referred to as a "vehicle entry function") of parking the vehicle 1 in the parking lot 20 for the vehicle 1 entering the parking lot 20. Hereinafter, a process executed by the parking management apparatus 100 in the vehicle entry function, more specifically, a process executed by the processor 110 will be described.

Figure 3:
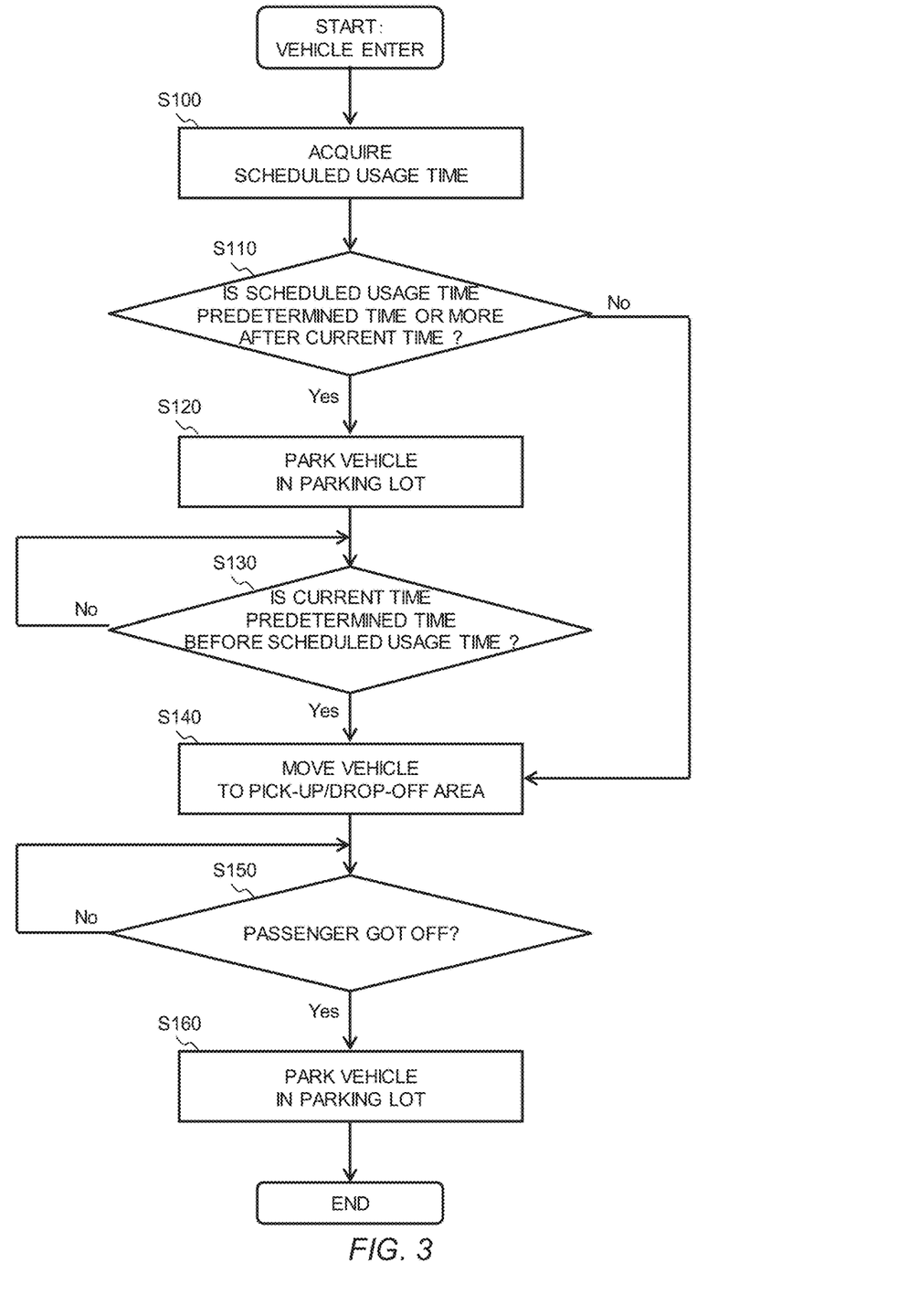
FIG. 3 is a flowchart showing an example of processes executed by one or more processors according to the present embodiment.

FIG. 3 is a flowchart showing a process executed by the processor 110 in the warehousing function. The process illustrated in FIG. 3 is started when the vehicle 1 enters the parking lot 20.

In step S100, the processor 110 acquires the scheduled usage time of the passenger of the vehicle 1. For example, the processor 110 acquires identification information of vehicle 1 or the passenger from the vehicle information 124, and acquires the scheduled usage time of the passenger by referring to the reservation information D11 using the identification information of vehicle 1 or the passenger. Alternatively, the processor 110 may be configured to acquire the scheduled usage time of the passenger from the user device 300 or the vehicle 1. In this case, the user device 300 or the HMI device 420 may be configured to receive an input of the scheduled usage time.

In step S110, the processor 110 determines whether or not the acquired scheduled usage time is after a predetermined time or more has elapsed from the current time. The scheduled usage time being after the elapse of the predetermined time or more from the current time indicates that the vehicle 1 arrived at the parking lot 20 earlier than the scheduled usage time. The predetermined time may be given in advance as the computer program 121.

When the scheduled usage time is after the predetermined time or more has elapsed from the current time (step S110; Yes), the processing proceeds to step S120. When the scheduled usage time is not after the elapse of the predetermined time or more from the current time (step S110; No), the processing proceeds to step S140.

In step S120 (first process), the processor 110 generates instruction information to park the vehicle 1 in the parking lot 20. For example, the processor 110 specifies a parking position at which the vehicle can be parked from the parking lot information 123 and generates instruction information indicating the specified parking position and a corridors for the movement to the parking position.

In particular, in step S120, the processor 110 may be configured to park the vehicle 1 at a position closer to the pick-up and drop-off area 21 as the current time is closer to the scheduled usage time. For example, when the parking management system 10 according to the present embodiment is applied to the parking lot 20 shown in FIG. 1, the parking space 22a is closer to the pick-up and drop-off area 21 than the parking space 22b, and the parking space 22b is closer to the pick-up and drop-off area 21 than the parking space 22c. Therefore, in this case, the processor 110 is configured to select a parking space in which the vehicle 1 is parked from the parking spaces 22a, 22b, and 22c according to the remaining time until the scheduled usage time. At this time, the processor 110 may be configured to select the parking space 22a when the remaining time is smaller than a first threshold value, select the parking space 22b when the remaining time is larger than the first threshold value and smaller than a second threshold value, and select the parking space 22c when the remaining time is larger than the second threshold value. The processor 110 may be configured to further select a parking frame in which the vehicle 1 is parked according to the remaining time.

After the vehicle 1 is parked in accordance with the instruction information, the process proceeds to step S130.

In step S130, the processor 110 determines whether or not the current time is a predetermined time before the scheduled usage time. The predetermined time may be given in advance as the computer program 121. In particular, the predetermined time may be equal to the predetermined time in step S110.

When the current time is a predetermined time before the scheduled usage time (step S130; Yes), the process proceeds to step S140. When the current time is not a predetermined time before the scheduled usage time (step S130; No), the processor 110 executes the processing related to step S130 again at a predetermined processing cycle. The processor 110 generates instruction information for continuing parking while repeatedly executing the process related to step S130.

In step S140 (second process), the processor 110 generates instruction information to move the vehicle 1 to the pick-up and drop-off area 21. For example, the processor 110 generates instruction information indicating a corridor for the movement from the parking position to the pick-up and drop-off area 21 and the start of movement. After the vehicle 1 completes the movement to the pick-up and drop-off area 21 in accordance with the instruction information, the process proceeds to step S150.

In step S150, the processor 110 determines whether or not the passenger has gotten off the vehicle 1 in the pick-up and drop-off area 21. For example, the processor 110 acquires the riding situation of the vehicle 1 from the vehicle information 124 and determines whether or not the passenger has got out of the vehicle 1.

When the passenger gets out of the vehicle 1 (Yes in step S150), the process proceeds to step S160. When the passenger has not got out of the vehicle 1 (step S150; No), the processor 110 executes the process related to step S150 again at a predetermined processing cycle. The processor 110 generates instruction information for continuing the stop in the pick-up and drop-off area 21 while repeatedly executing the process related to the step S150.

In step S160 (third process), the processor 110 generates instruction information to park the vehicle 1 in the parking lot 20. After step S160, the process is terminated.

In step S160, the processor 110 may be configured to acquire an expected passenger 3 time at which the stay stays in the facility 2, and to park the vehicle 1 at a position closer to the pick-up and drop-off area 21 as the expected stay time is shorter. The expected stay time is, for example, a consultation time, a hospitalization period, or the like when the facility 2 is a hospital. The processor 110 may be configured to estimate the expected passenger 3 time using, for example, the contents of the reservation of the stay in the reservation information D11 and the congestion situation or the reception situation of facility 2 in the facility status information D12 as indices. For example, when the parking management system 10 according to the present embodiment is applied to the parking lot 20 illustrated in FIG. 1, the processor 110 is configured to select a parking space in which the vehicle 1 is parked from the parking spaces 22*a*, 22*b*, and 22*c* according to the acquired expected stay time. The processor 110 may be configured to further select a parking frame in which the vehicle 1 is parked according to the acquired expected stay time.

As described above, the parking management apparatus 100 executes the process related to the vehicle entry function.

Figure 4:
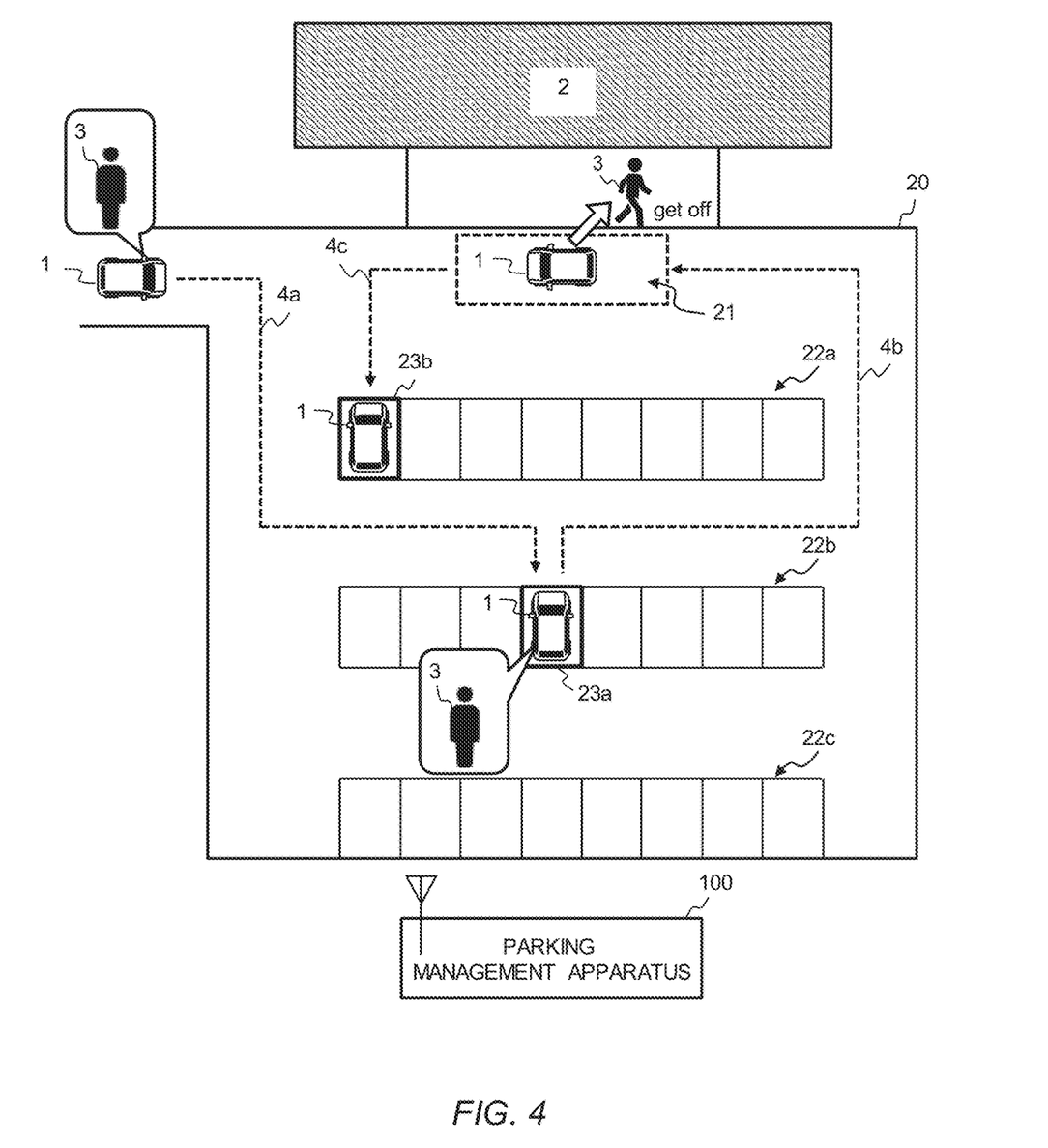
FIG. 4 is a conceptual diagram showing an practical example of the function of the parking management system according to the present embodiment.

FIG. 4 is a conceptual diagram showing an practical example of the warehousing function. FIG. 4 shows a case where the scheduled usage time of the passenger 3 of the vehicle 1 entering the parking lot 20 is after a predetermined time or more has elapsed from the current time.

First, the parking management apparatus 100 receives the scheduled usage time after a predetermined time or more has elapsed from the current time, and parks the vehicle 1 in the parking lot 20. In FIG. 4, the vehicle 1 is parked in a parking spot 4*a* of a parking space 22*b* along a travel path 23*a*. At this time, the passenger 3 remains in the vehicle 1.

Next, the parking management apparatus 100 moves the vehicle 1 to the pick-up and drop-off area 21 in response to the current time becoming a predetermined time before the scheduled usage time. In FIG. 4, the vehicle 1 is moving to the pick-up and drop-off area 21 along the travel path 4*b*.

Next, the parking management apparatus 100 receives the fact that the passenger 3 has got off from the vehicle 1 in the pick-up and drop-off area 21, and parks the vehicle 1 in the parking lot 20. In FIG. 4, the vehicle 1 is parked in a parking spot 4*c* of a parking space 22*a* along a travel path 23*b*.

As described above, according to the present embodiment, when the vehicle 1 entering the parking lot 20 arrives at the parking lot 20 earlier than the scheduled usage time of the passenger 3, the vehicle 1 is parked in the parking lot 20 while riding the passenger 3. When the scheduled usage time of the passenger 3 approaches, the vehicle 1 moves to the pick-up and drop-off area 21 and gets off the passenger 3.

Thus, even if the vehicle 1 arrives at the parking lot 20 earlier than the scheduled usage time, the passenger 3 of the vehicle 1 can spend time in the vehicle until the scheduled usage time approaches. For example, the passenger 3 of the vehicle 1 can watch a moving image or music, eat or drink, or have a conversation with other people in the vehicle without any trouble. From the standpoint of the facility 2, the vehicle 1 can be effectively used as a standby space.

Further, as described above, in the present embodiment, when the vehicle 1 entering the parking lot 20 is parked (first process), the vehicle 1 may be parked at a position closer to the pick-up and drop-off area 21 as the current time is closer to the scheduled usage time. According to the present embodiment, it is assumed that the closer the current time is to the scheduled usage time, the more frequently the vehicle 1 moves. Therefore, by applying the above configuration, it is possible to improve the efficiency of the traffic flow in the parking lot 20.

Further, as described above, in the present embodiment, when the vehicle 1 is parked from the pick-up and drop-off area 21 (the third process), the expected passenger 3 time of the stay may be acquired, and the vehicle 1 may be parked at a position closer to the pick-up and drop-off area 21 as the expected stay time is shorter. After the use of the facility 2 is finished, the passenger 3 is expected to get on the parked vehicle 1 and exit from the parking lot 20. That is, it is assumed that the vehicle 1 moves more frequently as the expected stay time is shorter. Therefore, by applying the above configuration, it is possible to further improve the efficiency of the traffic flow in the parking lot 20.

In the present embodiment, when the vehicle 1 enters the parking lot 20, the parking management apparatus 100 may not be able to acquire the scheduled usage time of the passenger 3. For example, passenger 3 has not reserved facility 2. In such a case, the processor 110 may be configured to execute the processing shown in FIG. 5 in the warehousing function.

Figure 5:
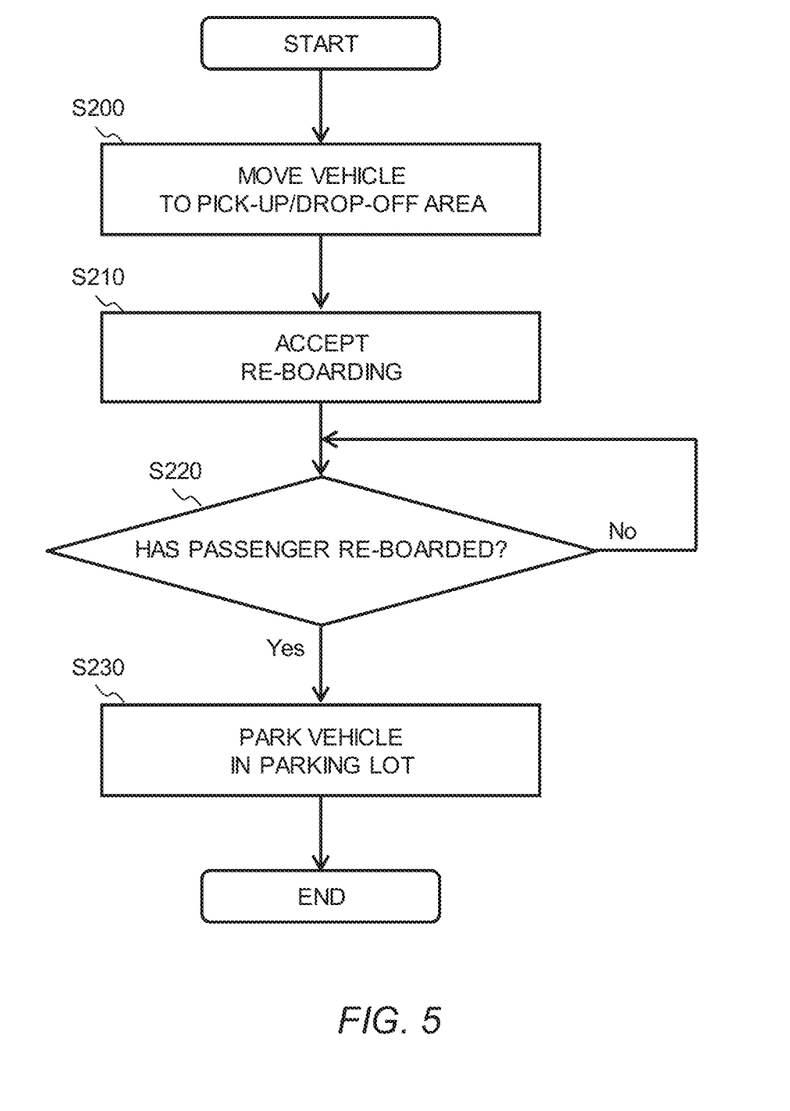
FIG. 5 is a flowchart showing an example of processes executed by the one or more processors.

In step S200 (fourth process), the processor 110 generates instruction information to move the vehicle 1 to the pick-up and drop-off area 21. After the vehicle 1 moves to the pick-up and drop-off area 21 in accordance with the instruction information and the passenger 3 gets off the vehicle 1, the process proceeds to step S210.

In step S210, the processor 110 causes the vehicle 1 to wait in the pick-up and drop-off area 21, and accepts re-boarding of the vehicle 1.

In step S220, the processor 110 determines whether or not the passenger 3 has re-boarded the vehicle 1. For example, the processor 110 acquires the boarding situation of the vehicle 1 from the vehicle information 124 and determines whether or not the passenger 3 has boarded the vehicle 1 again.

When the passenger 3 re-enters the vehicle 1 (step S220; Yes), the process proceeds to step S230. When the passenger 3 has not re-boarded the vehicle 1 (step S220; No), the processor 110 executes the processing related to step S220 again at a predetermined processing cycle. The processor 110 generates instruction information for continuing the stop in the pick-up and drop-off area 21 while repeatedly executing the process related to the step S220.

In operation S230, the processor 110 generates instruction information to park the vehicle 1 in the parking lot 20.

After step S230, the process is terminated. However, after step S230, the processor 110 may be configured to further execute a process of acquiring the scheduled usage time of passenger 3. This is because when passenger 3 gets on the vehicle again, passenger 3 may have made a reservation at the reception of facility 2. When the scheduled usage time of the passenger 3 can be acquired, the process may proceed to step S130 shown in FIG. 3.

The processor 110 may be configured to execute a process of terminating the acceptance of the reboarding and parking the vehicle 1 in the parking lot 20 when a predetermined period has elapsed since the acceptance of the reboarding to the vehicle 1 in step S210. This is because, when the predetermined period has elapsed since the reboarding was accepted, it is considered that the passenger 3 does not reboard the vehicle 1 for the reason that the user can use the facility 2 without making a reservation or the like.

Figure 6:
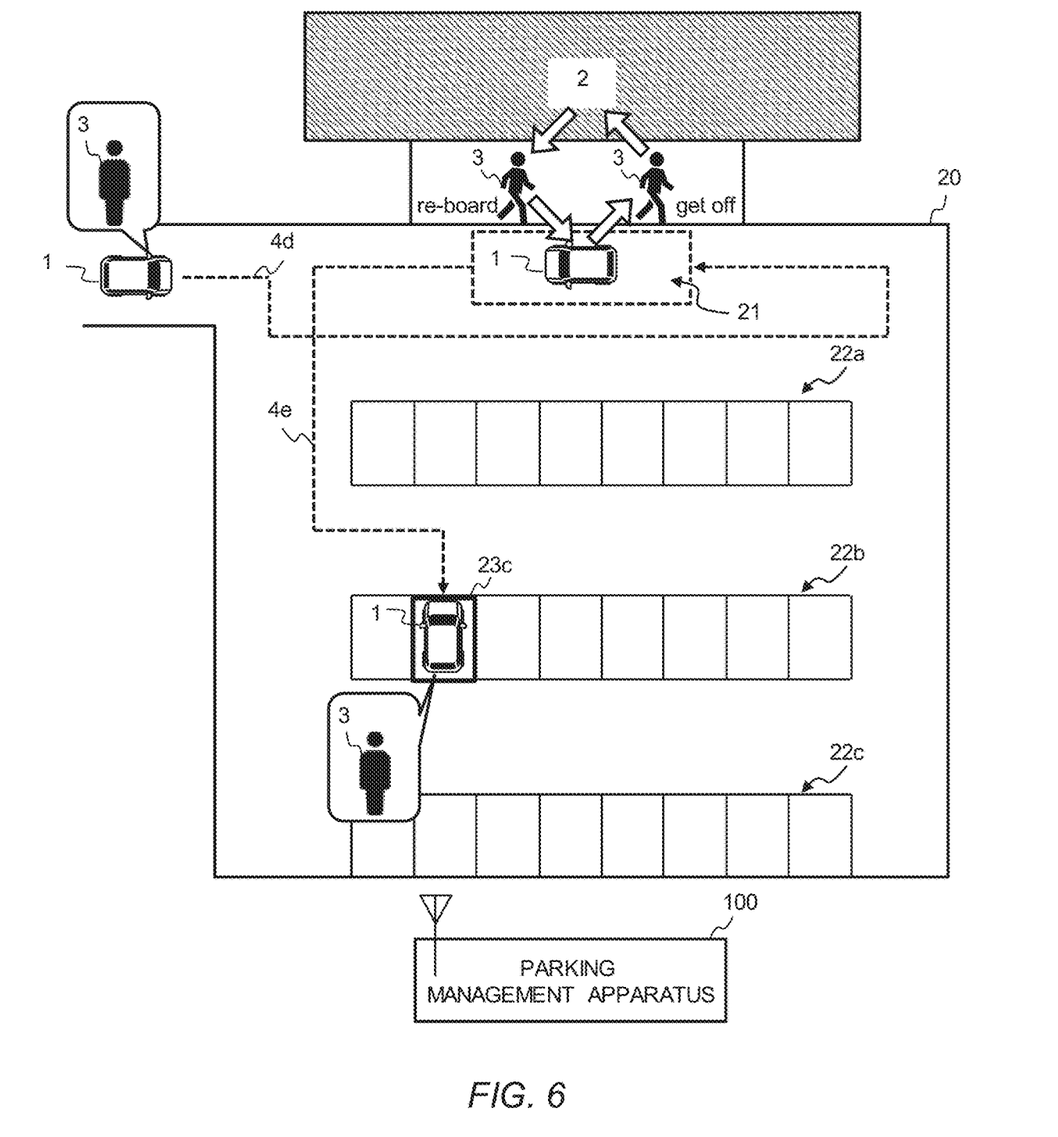
FIG. 6 is a conceptual diagram showing an practical example of the function of the parking management system according to the present embodiment.

FIG. 6 is a conceptual diagram showing an practical example of the warehousing function when the scheduled usage time of passenger 3 cannot be acquired.

First, the parking management apparatus 100 moves the vehicle 1 to the pick-up and drop-off area 21. In FIG. 6, the vehicle 1 is moved to the pick-up and drop-off area 21 along the travel path 4d.

Next, after the passenger 3 gets off the vehicle 1, the parking management apparatus 100 causes the vehicle 1 to wait in the pick-up and drop-off area 21 and accepts re-boarding of the vehicle 1.

Next, the parking management apparatus 100 receives the reboarding of the passenger 3 on the vehicle 1 and parks the vehicle 1 in the parking lot. In FIG. 6, vehicle 1 is parked in a parking frame 4e of a parking space 22b along a travel path 23c. At this time, the parking management apparatus 100 may be configured to park the vehicle 1 in a parking space closer to the pick-up and drop-off area 21 as the current time is closer to the scheduled usage time when the scheduled usage time of the passenger 3 can be acquired.

As described above, the processor 110 executes the above-described process, and thus the present embodiment can be applied to a case where the scheduled usage time of the passenger 3 cannot be acquired when the vehicle 1 enters the parking lot 20.

As described above, the parking function of the parking management system 10 according to the present embodiment is realized by the processing executed by the processor 110. The parking management method according to the present embodiment is realized by the processor 110 executing the processing in this way. The parking management program according to the present embodiment is realized by the computer program 121 that causes the processor to execute the processing in this way.

What is claimed is:

1. A parking management system for managing parking of vehicles in a parking lot of a specific facility, the parking lot including a pick-up and drop-off area,
   the parking management system comprising one or more processors configured to execute:
   when a vehicle enters the parking lot, acquiring a scheduled usage time at which a passenger of the vehicle is scheduled to use the specific facility;
   a first process of parking the vehicle in the parking lot when the scheduled usage time is more than a predetermined time after a current time; and
   a second process of moving the vehicle to the pick-up and drop-off area in response to the current time becoming the predetermined time before the scheduled usage time after the vehicle is parked in the parking lot, wherein
   the one or more processors are configured to further execute:
   moving the vehicle to the pick-up and drop-off area in response to the scheduled usage time being not able to be acquired when the vehicle enters the parking lot;
   after the passenger gets off the vehicle at the pick-up and drop-off area, causing the vehicle to stop at the pick-up and drop-off area and accepting re-boarding of the vehicle; and
   parking the vehicle in the parking lot in response to the passenger re-boarding the vehicle.

2. The parking management system according to claim 1, wherein
   the first process includes parking the vehicle at a position closer to the pick-up and drop-off area when the current time is closer to the scheduled usage time.

3. The parking management system according to claim 1, wherein
   the one or more processors are configured to further execute a third process of parking the vehicle in the parking lot in response to the passenger getting off the vehicle at the pick-up and drop-off area after the vehicle is moved to the pick-up and drop-off area, and
   the third process includes:
   acquiring an expected stay time for which the passenger is expected to stay at the specific facility; and
   parking the vehicle at a position closer to the pick-up and drop-off area when the expected stay time is shorter.

4. A parking management method for managing parking of vehicles in a parking lot of a specific facility, the parking lot including a pick-up and drop-off area,
   the parking management method including:
   when a vehicle enters the parking lot, acquiring a scheduled usage time at which a passenger of the vehicle is scheduled to use the specific facility;
   parking the vehicle in the parking lot when the scheduled usage time is more than a predetermined time after a current time; and
   moving the vehicle to the pick-up and drop-off area in response to the current time becoming a predetermined time before the scheduled usage time after the vehicle is parked in the parking lot; wherein
   the parking management method further includes:
   moving the vehicle to the pick-up and drop-off area in response to the scheduled usage time being not able to be acquired when the vehicle enters the parking lot;

after the passenger gets off the vehicle at the pick-up and drop-off area, causing the vehicle to stop at the pick-up and drop-off area and accepting re-boarding of the vehicle; and parking the vehicle in the parking lot in response to the passenger re-boarding the vehicle.

\* \* \* \* \*